Patented July 14, 1942

2,289,731

UNITED STATES PATENT OFFICE 2,289,731

METHOD FOR THE REACTIVATION OF CATALYSTS FOR THE HYDROGENATION OF CARBON OXIDE

Otto Roelen, Oberhausen-Holten, Heinrich Heckel, Dinslaken, and Franz Hanisch, Duisburg-Hamborn, Germany, assignors, by mesne assignments, to Hydrocarbon Synthesis Corporation, Linden, N. J.

No Drawing. Application November 7, 1939, Serial No. 303,312. In Germany November 7, 1938

5 Claims. (Cl. 252—243)

The reactivation (regeneration) of exhausted catalysts, having been used for the synthesis of low boiling hydrocarbons such as gasoline, from mixtures of carbon oxide and hydrogen, is known by exposing the catalyst-mass to a current of hydrogen at temperatures of 300° C. and higher. According to that method, the treatment with hydrogen is stopped as soon as the high-molecular products, deposited in the catalyst during the synthesis, have been driven out.

According to this form of hydrogen treatment it is impossible to raise the activity of the contact mass, even approximately, to the original level. On the contrary, to maintain a sufficient activity of the contact mass, it remains necessary to remove the active parts (e. g. metals and metal oxides) by dissolving them, e. g. in nitric acid, filtering the solution, reprecipitating the active parts, e. g. by carbonate of alkali, drying the precipitate, and so on. These measures entail a great deal of work, and cause a considerable loss of material, necessitating an extensive and expensive store of the valuable contact-metals.

It has now been found that the original activity of the catalyst can be regained by continuing the treatment with hydrogen beyond the removal of paraffine. This offers extraordinary technical advantages, because the cumbersome above mentioned measures for the regeneration of the exhausted catalyst-mass by way of dissolving and precipitating, can be completely omitted.

The new method can be carried out in such a manner that the paraffine present in an exhausted catalyst is previously removed in the usual way by heating with hydrogen at 350° C. for about two hours. For a direct recovery of the full activity, the treatment with hydrogen is continued, preferably at temperatures of about 400° and higher. In each case this treatment with hydrogen is applied until not only the whole deposit of paraffine-hydrocarbons, but also other precipitates inducing inactivity are removed. The treatment with gas is continued until the catalyst has attained the activity of a fresh contact.

It is recommended in such treatments with hydrogen to raise the temperature gradually. In this way one avoids the formation of decomposition products which might give rise to a deposit of carbon and of other not easily removable high-molecular products on the contact.

Moreover, the best results are obtained by directing exceedingly high currents of gas over the contact to be regenerated. A current of 1000 cubic metres of hydrogen per hour and per square metre of cross-section of the reaction-tube is particularly advantageous. If a particularly good action is not required, it is even possible to apply a current of 500 cubic metres per hour and per square metre.

The large quantities of hydrogen required, make a circular course for the hydrogen necessary. At the same time it is desirable, before reintroducing the hydrogen into the catalyst-mass to be regenerated, to free it as completely as possible from gases containing oxygen, such as e. g. carbonic acid and water-vapour.

The water-vapour can be removed by absorbents such as e. g. gel of silica, or by cooling, or by any other suitable method. For the removal of the carbonic acid the usual absorbents, e. g. lye of alkali or the like, may be applied.

When using the method described above, it is also desirable to remove the water-vapour and the carbonic acid at least until the gas led back contains less than 2.5 grams of carbonic acid and less than 1 gram of water-vapour per cubic metre.

Catalysts regenerated in this way show an extraordinarily high activity when used again. This activity is not at all inferior to that of fresh contact masses obtained by precipitation, and it cannot be obtained, even approximately, by means of the treatment of catalysts with hydrogen in the known manner.

Finally, it has been found of advantage in the new process for catalyst-regeneration as described above, if the catalysts are exposed to an oxidising action before being treated with hydrogen. This can be carried out with oxygen, or with gases containing or producing oxygen, such as e. g. water-vapour or carbonic acid, or with mixtures of these gases at increased temperature. Consequently a superficial oxidation of the catalyst-metal is caused. In this way also, those places in the exhausted catalyst are exposed which are only accessible with difficulty to the action of hydrogen. Thus the following reduction-treatment can be carried out more simply, more easily and with more security.

The following example will further illustrate the method as described above.

*Example*

A catalyst made in the usual way by precipitation, containing 100 parts of cobalt-metal, 5 parts of thoriumoxide ($ThO_2$) and 8 parts of magnesia (MgO) per 200 parts of infusorial earth and having been used during 3500 hours at temperatures of about 185–192° C. for the synthesis of gasoline, was first treated for 150 minutes at 200° C. with a mixture of nitrogen and hydrogen, containing 75 parts of volume of hydrogen per 1 part of volume of nitrogen. Within half an hour the temperature was raised to 350° C. The subsequent treatment with hydrogen was carried out as follows: For the first 30 minutes it was heated at 350° C., then for 30 minutes at 400° C., and finally for 120 minutes at 450° C. Thereupon the contact was used again at 185° C. It showed the same activity which it had originally.

What we claim is:

1. In the reactivation of spent metal catalysts derived from a process wherein low boiling hydrocarbons of the gasoline type are synthesized by passing carbon monoxide and hydrogen through a catalytic chamber filled with said catalyst and heated to temperatures of the order of 185° to 192° C., the process which comprises increasing the temperature of the catalytic chamber and passing hydrogen therethrough in contact with said catalyst until the paraffins are removed from the catalyst, then continuing the treatment at still higher temperatures approaching but not substantially exceeding 450° C. for a time sufficient to restore said catalyst to substantially the activity of a fresh catalyst.

2. In the reactivation of spent metal catalysts derived from a process wherein low boiling hydrocarbons of the gasoline type are synthesized by passing carbon monoxide and hydrogen through a catalytic chamber filled with said catalyst and heated to temperatures of the order of 185° to 192° C., the process which comprises passing hydrogen at elevated temperatures in contact with said spent catalyst until the paraffins are removed therefrom, then continuing the hydrogen treatment at gradually rising temperatures approaching but not substantially exceeding 450° C. while passing the hydrogen through said catalytic chamber at a velocity of not substantially less than 500 cubic meters per hour per square meter of cross-section, said treatment being continued until the catalyst has been restored substantially to the activity of a fresh catalyst.

3. In the reactivation of spent metal catalysts derived from a process wherein low boiling hydrocarbons of the gasoline type are synthesized by passing carbon monoxide and hydrogen through a catalytic chamber filled with said catalyst and heated to temperatures of the order of 185° to 192° C., the process which comprises treating the spent catalyst with a gas mixture comprising about 1 part by volume of nitrogen and 75 parts by volume of hydrogen at a temperature of about 200° C. for a period of about 150 minutes, then raising the temperature to about 350° C. for a period of about 30 minutes, then to about 400° C. for a period of about 30 minutes and finally to about 450° C. for a period of about two hours.

4. A method as claimed in claim 2 wherein the water vapor and carbonic acid present in the hydrogen after passing through the catalyst is removed and the substantially purified hydrogen is recycled through the catalyst.

5. A method as claimed in claim 2 wherein the spent catalyst is oxidized before the treatment with hydrogen.

OTTO ROELEN.
HEINRICH HECKEL.
FRANZ HANISCH.